United States Patent [19]

Hideo

[11] Patent Number: 4,516,865
[45] Date of Patent: May 14, 1985

[54] RESISTANCE THERMOMETER

[76] Inventor: Sugimori Hideo, 12-2, Koaza Shimokubota, Ohaza Hohsono, Seikacho, Sohrakugun, Kyoto-fu, Japan

[21] Appl. No.: 499,427

[22] Filed: May 31, 1983

[30] Foreign Application Priority Data

May 31, 1982 [JP] Japan ................... 57-093306

[51] Int. Cl.$^3$ ............ G01K 7/20; G01K 7/22
[52] U.S. Cl. .................... 374/172; 374/185; 323/365; 330/143; 338/25
[58] Field of Search ........... 374/114, 163, 172, 173, 374/183, 185; 323/364–367; 338/22, 25, 28; 330/143, 254, 256

[56] References Cited

U.S. PATENT DOCUMENTS 3,949,609  4/1976  Hammerslag ............... 73/362 AR

FOREIGN PATENT DOCUMENTS 138820  11/1979  Fed. Rep. of Germany ...... 374/173

OTHER PUBLICATIONS

T. S. Sligh, Jr., *Scientific Papers of the Bureau of Standards*, 1/5/21, pp. 51 and 52.
K. Kraus, *Archiv fur Technisches Messen and Messtechnische Praxis*, No. 478, pp. 187–190, Nov. 1975.
Henry E. Sostman, "Resistance Thermometers", *Instruments & Control Systems*, Oct. 1966.

Primary Examiner—Charles Frankfort
Assistant Examiner—W. Morris Worth
Attorney, Agent, or Firm—Wenderoth, Lind & Ponack

[57] ABSTRACT

A resistance thermometer in which a temperature sensing resistor is connected in parallel with a series combination consisting of a signal output resistor and a compensating resistor. By choosing the resistance ratio between two resistors to be equal to the ratio of the desired resistance value to the error of the temperature sensing resistor, the output voltage developed on the signal output resistor reflects the voltage expected on the temperature sensing resistor without the resistance error thereof. The temperature sensing resistor and the compensating resistor constitute a circuit unit which is detachable from the rest of the resistance thermometer.

1 Claim, 5 Drawing Figures

RESISTANCE THERMOMETER

BACKGROUND OF THE INVENTION

The present invention relates to a resistance thermometer, and more particularly to a resistance thermometer which does not need any adjustment after a replacement of a temperature sensing unit.

For a temperature sensor for use in a resistance thermometer, a platinum resistor is commonly used, since it has a stable resistance value during aging. However, it is troublesome to make platinum resistors so as to have the same precision resistance, so that the manufacturing yield of platinum resistors is low and the price is very high. The wide scattering of the resistance value is very inconvenient, especially for the replacement of the temperature sensor. In a conventional resistance thermometer it is often necessary to adjust the electrical circuit of the thermometer after the replacement of a temperature sensor, since the resistance value in general varies for each sensor.

SUMMARY OF THE INVENTION

An object of the present invention is, therefore, to provide a resistance thermometer which does not need any adjustment after the replacement of a temperature sensor, even if the resistance of the temperature sensor to be replaced is not exactly the same.

Briefly, a resistance thermometer based on the present invention comprises a temperature sensing resistor, a compensating resistor, a signal output resistor and a current source. The temperature sensing resistor which is to be subject to a temperature to be measured is connected in parallel with a series combination of the compensation resistor and the signal output resistor, and this entire parallel combination of resistors is supplied with a current from the current source. In this circuit construction, the resistance ratio of the signal output resistor to the compensation resistor is chosen to be equal to the ratio of a desired resistance value of the temperature sensing resistor to its positive resistance error. The temperature sensing resistor and the compensating resistor constitute a temperature sensing circuit unit. But thermally, the compensating resistor is isolated from the temperature sensing resistor, and is kept at the same room temperature as the signal output resistor. This temperature sensing circuit unit is designed so as to be detachable from the rest of the resistance thermometer. A voltage developed on the signal output resistor is used as an output temperature signal.

DESCRIPTION OF THE PREFERRED EMBODIMENTS

Figure 1:
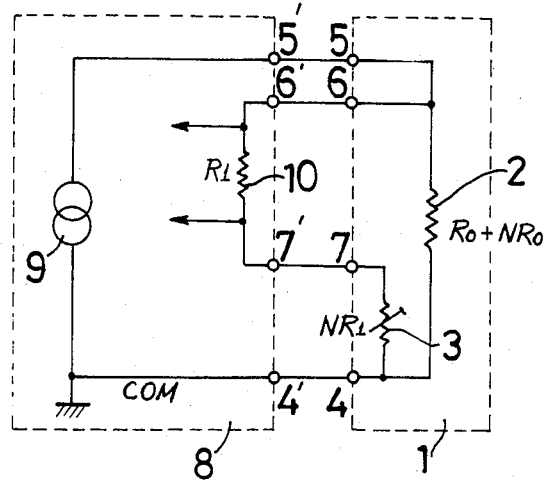
FIG. 1 shows a circuit construction illustrating the principle of the present invention.

A circuit is shown in FIG. 1 for illustrating the principle of the present invention. A temperature sensing resistor 2 constitutes a circuit unit 1 together with a variable compensating resistor 3. One end of each resistor has a common connection forming a common terminal 4. The other end of the resistor 2 is connected to terminals 5 and 6, while the other end of the compensating resistor 3 is connected to a terminal 7. Corresponding to the above-noted terminals, the main part 8 of the device is provided with terminals 5' and 6', 7', and 4'. Between the terminals 6' and 7', a signal output resistor 10 is connected, while a constant-current source 9 has connections to terminals 5' and 4'. In such a circuit construction, the temperature sensing resistor 2 has a resistance value $R_0 + NR_0$, where $R_0$ is a precise resistance value desired of this resistor, wherein $NR_0$ is a positive error value. (N is, of course, much smaller than unity.) Therefore, if the resistance ratio between the signal output resistor 10 and the compensation resistor 3 is chosen such that $R_0 : NR_0 = 1 : N$, then the voltage developed on the signal output resistor 10 is equal to the value expected on the temperature sensing resistor 2 when it exactly has the desired resistance $R_0$ without the error resistance component $NR_0$. This is easily shown as follows:

If the resistor 2 is supplied with a current of I, the voltage $E_0$ developed on the resistor 10 is given by $$E_0 = I(R_0 + NR_0) \frac{R_1}{R_1 + NR_1}$$
$$= IR_0$$

where $R_1$ and $NR_1$ are resistance values of the signal output resistor 10 and the compensation resistor 3. Therefore, if the current I flowing through the sensing resistor 2 is kept constant, an output voltage developed on the signal output resistor 10 always reflects a temperature measured by the sensing resistor 2, even if the resistance value varies in accordance with a variation of the temperature to be measured. In the circuit shown in FIG. 1, $R_1 + NR_1$ must be much larger than the resistance of the sensing resistor 2, for keeping I constant irrespective of the resistance variation of the sensing resistor 2. Unless the current I is kept constant, the output does not reflect the measured temperature, although it is exactly equal to the voltage expected on the error-free sensing resistor. In case the temperature varies with respect to t, the resistance $R_0 + NR_0 = R_0 (1+N)$ varies with respect to $R_0 (1+N)(1+\alpha t) = R_0 (1+\alpha t) + NR_0 (1+\alpha t)$, where $\alpha$ is a temperature coefficient. The first term $R_0(1+\alpha t)$ corresponds to the output voltage $E_0$, while the second terms correspond to the voltage appearing on the compensating resistor 3.

In such a temperature measurement technique, an error which is expected due to the resistance of the wire connecting the terminal 4' to the terminal 4 can be excluded by adjusting the compensating resistor 3 in advance in consideration of the wire resistance.

Figure 2:
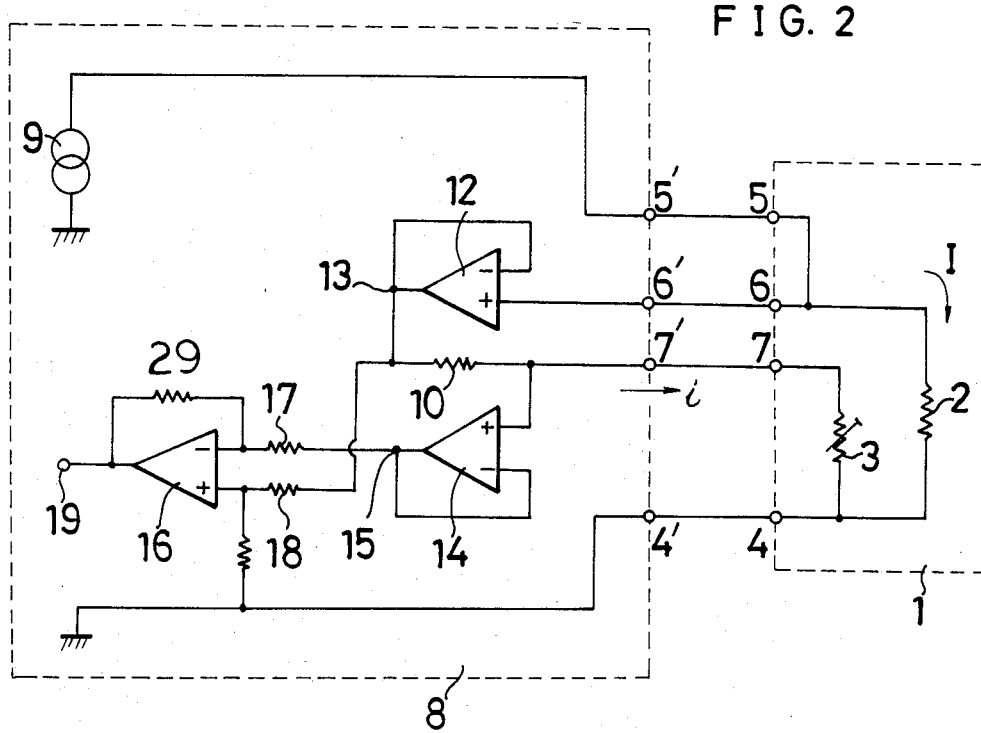
FIG. 2 shows a circuit construction of a first embodiment of the present invention.

FIG. 2 shows a circuit construction of a first embodiment of the present invention. In the figure, all the components corresponding to those shown in FIG. 1 are given the same reference number. In this embodiment, an impedance converter 12 is provided between the output terminal 6 (6') and the signal output resistor 10, so that a current I supplied to the sensing resistor 2 from the constant-current source 9 is kept constant with respect to temperature variations, even if the resistance of the resistor 10 is not much larger than the resistance of the sensing resistor 2. On the other hand, the output from the terminal 7 (7') is fed from the output point 15 of an impedance converter 14 to the inverting input terminal of a differential amplifier 16 through an input resistance 17 so as to be subtracted in the amplifier 16 from the output of the signal output resistor 10. This output from the signal output resistor 10 is input to the non-inverting input terminal of the differential amplifier 16 through a resistor 18. The differential amplifier 16 thus outputs only a voltage developed across the signal output resistor 10.

Figure 3:
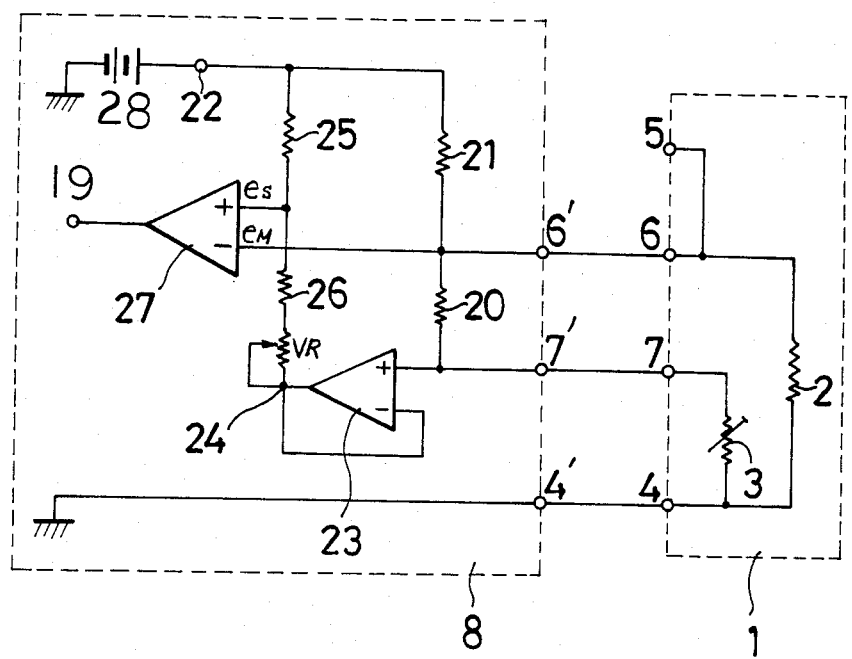
FIG. 3 shows a circuit construction of a second embodiment of the present invention.

FIG. 3 illustrates a circuit construction of a second embodiment of the present invention. This embodiment is an example of applying the present invention to a heater control. A temperature sensing resistor 2, subjected to the heat produced by a heater (not shown in the figure) to be controlled, has its current supplied from a constant-voltage source 28 having a terminal 22 through a resistor 21. Furthermore, in this embodiment, the series combination of a signal output resistor 20 (which corresponds to resistor 10 in FIG. 2) and a compensating resistor 3 is directly connected in parallel with the sensing resistor 1. Therefore, in order to make the output of the sensing resistor 2 independent of these resistors 20 and 3, their resistance sum is chosen to be sufficiently high so that the current through them can be ignored in comparison with the current flowing in the sensing resistor 2. The output voltage of the constant-voltage source 28 is thus proportionally distributed between the resistor 21 and the sensing resistor 2 according to their resistance ratio, resulting in a voltage $e_M$ across the sensing resistor 2. This voltage eM, which varies in accordance with the resistance of the sensing resistor 2, is supplied to the inverting input terminal of a comparator 27. On the other hand, the potential difference between the output of the voltage source 28 and the output point 24 of an impedance converter 23 is divided by resistors 25 and 26 and a variable resistor VR which is in series therewith, so as to provide a reference voltage $e_S$ to the non-inverting input terminal of the comparator 27. The impedance converter 23 is supplied with the output of the compensating resistor 3, and the output point 24 is therefore kept at a potential equal to the output of the compensating resistor 3.

In such a circuit construction, when the voltage $e_M$ of the sensing resistor 2 is lower than the reference voltage $e_S$, the comparator continues to output a high-level signal. Once the voltage $e_M$ exceeds the voltage $e_S$ owing to a temperature increase which causes the resistance of the sensing resistor 2 to increase, the output of the comparator 27 becomes a low level. The output of the comparator 27 is, therefore, used as an on-off control signal for controlling the operation of a heater. The setting of the temperature is carried out by setting the reference voltage $e_S$ to the value corresponding to a predetermined temperature through an adjustment of the variable resistor VR.

Figure 4:
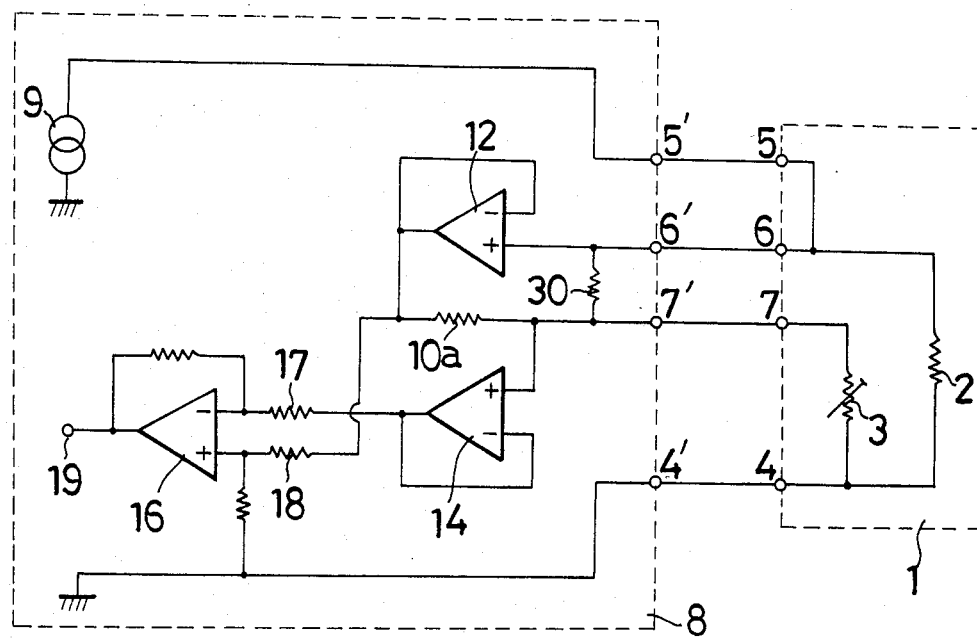
FIG. 4 shows a circuit construction of a third embodiment of the present invention.

FIG. 4 shows a third embodiment of the present invention. This embodiment is an example of modifying the first embodiment in FIG. 2 so as to make the output approximately linear with respect to temperature variations even in the case where the temperature-resistance characteristics of the sensing resistor cannot be considered to be linear.

A well-known method for reforming the non-linear characteristic of a temperature-sensing resistor is to provide the temperature-sensing resistor with a characteristic-improving resistor in parallel therewith, the resistance of which is much higher than the resistance of the sensing resistor at the lowest temperature in the range of the temperature measurement. In a temperature range nearest the lowest temperature, the parallel resistance of the sensing resistor and the characteristic-improving resistor is determined mainly by the resistance of the sensing resistor, because the characteristic-improving resistor has a much higher resistance than the sensing resistor. As the resistance of the sensing resistor increases in accordance with a temperature increase, the resistance of the characteristic-improving resistor gradually begins to contribute to the whole resistance of the parallel combination, causing its resultant resistance to decrease, and thus bringing the resultant temperature-resistance curve near to a straight line. At very high temperature, exceeding a certain temperature range, the resultant resistance, of course, converges to the resistance value of the characteristic-improving resistor. Therefore, this method for improving the linearity has an application limit. The resistance of the characteristic-improving resistor is determined in consideration of a desired degree of linearity and the temperature range in which the linearity is expected. In the present embodiment, a resistor 30 is a characteristic-improving resistor. Its value can be chosen as desired according to the above-noted condition for determining the resistance value irrespective of the signal output resistor 10$a$ (which corresponds to resistor 10 in FIG. 2), because the resistor 30 and 10$a$ are isolated with respect to their currents by the impedance converter 12.

Figure 5:
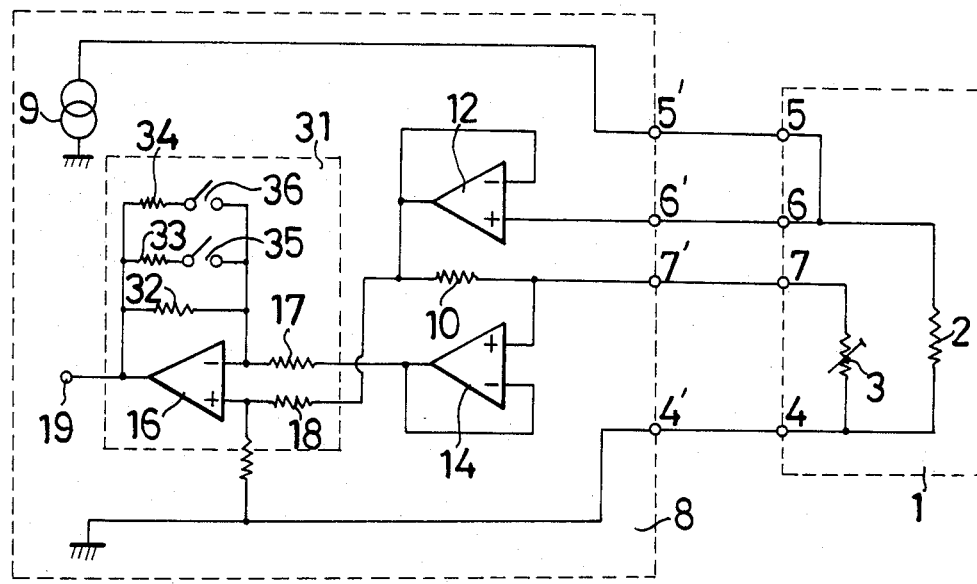
FIG. 5 shows a circuit construction of a fourth embodiment of the present invention.

FIG. 5 shows a fourth embodiment of the present invention. As is mentioned above, the above-noted method of improving the temperature-resistance characteristic cannot be applied when the range of the temperature measurement is very wide. For eliminating such a disadvantage, this embodiment is devised to make the feedback resistance of a differential amplifier 31 changeable in accordance with the temperature range in which a linear characteristic is desired. By selecting the combination of resistors 32, 33, and 34 through the operation of switches 36 and 35, the output from a terminal 19 is linearized with respect to temperature variations in a stepwise manner in four temperature ranges.

That is, FIG. 5 is identical to FIG. 2 except for the fact that feedback resistor 29 has been replaced by the parallel combination of resistors 32–34. The two switches 35 and 36 have a total of four combinations of operation, resulting in the feedback resistance for amplifier 16 (analagous to resistor 29 of FIG. 2) having four different values equal to: the resistance of resistor 32 above, the resistance of resistor 32 in parallel with resistor 33, the resistance of resistor 32 in parallel with resistor 34, and the resistance of resistor 32 in parallel with resistor 33 and resistor 34.

Thus, since the gain of the amplifier 16 can be varied in a stepwise manner so as to have four different values, the corresponding output voltage from terminal 19 (which corresponds to the temperature sensed by resistor 2) can be varied in a stepwise manner so as to effectively linearize the temperature-resistance characteristic of the resistor 2.

According to the present invention, even if the temperature-sensing resistor 2 does not have an exactly proper resistance, the measurement can be carried out by adjusting the compensation resistor 3 in the temperature-sensing unit 1. The previous adjustment of the compensating resistor 3 enables the sensing unit to be replaced, when the sensing resistor 2 is damaged, with a new sensing unit without any other adjustments of the apparatus.

What is claimed is:

1. A resistance thermometer comprising:
a temperature sensing circuit unit consisting of a temperature sensing resistor to be subject to a temperature to be measured and a compensating resistor, said temperature sensing resistor and said compensating resistor each having first and second terminals, wherein said first terminals of said temperature sensing resistor and said compensating resistor are connected together so as to comprise a common terminal, and said second terminal of said temperature sensing resistor comprised a current input terminal, and said second terminal of said compensating resistor comprises a signal output terminal;
a current source connected between said current input terminal and said common terminal;
a signal output resistor connected between said current input terminal and said signal output terminal;
wherein the ratio of resistance of said signal output resistor compared with resistance of said compensating resistor is equal to the ratio of desired resistance of said temperature sensing resistor compared with a positive resistance error of said temperature sensing resistor.

* * * * *